United States Patent
Yasui

[19]
[11] Patent Number: 6,132,332
[45] Date of Patent: Oct. 17, 2000

[54] FOUR-WHEEL DRIVE SYSTEM

[75] Inventor: Makoto Yasui, Shizuoka, Japan

[73] Assignee: NTN Corporation, Osaka, Japan

[21] Appl. No.: 09/317,206

[22] Filed: May 24, 1999

[30] Foreign Application Priority Data

May 25, 1998 [JP] Japan .................................. 10-142565
Jun. 2, 1998 [JP] Japan .................................. 10-153155

[51] Int. Cl.[7] ................................................ B60K 41/04
[52] U.S. Cl. ............................................................ 477/36
[58] Field of Search ................................ 477/36; 192/38, 192/44

[56] References Cited

U.S. PATENT DOCUMENTS

| | | | |
|---|---|---|---|
| 4,989,686 | 2/1991 | Miller et al. | 180/197 |
| 5,522,777 | 6/1996 | Baxter et al. | 477/36 |
| 5,839,084 | 11/1998 | Takasaki et al. | 701/67 |
| 5,971,123 | 10/1999 | Ochab et al. | 192/48.2 |

*Primary Examiner*—Dirk Wright
*Attorney, Agent, or Firm*—Wenderoth, Lind & Ponack, L.L.P.

[57] ABSTRACT

A four-wheel drive system according to the invention can shorten a delay in response of an electromagnetic clutch and permits shockless transition to 4WD. In a rotation transmission device having a two-way clutch including rollers mounted between an inner member and an outer ring for selective transmission and non-transmission of rotation between the inner member and the outer ring, an electromagnetic clutch for controlling the locking and freeing of the two-way clutch, and a current control mechanism for controlling the locking and freeing of the two-way clutch, a current supplied to the current control mechanism is controlled based on an input signal from a sensor for detecting the load on the engine to shorten a delay in response until the two-way clutch locks after the supply of a current to the electromagnetic coil has begun and to prevent shocks during transition to 4WD.

38 Claims, 18 Drawing Sheets

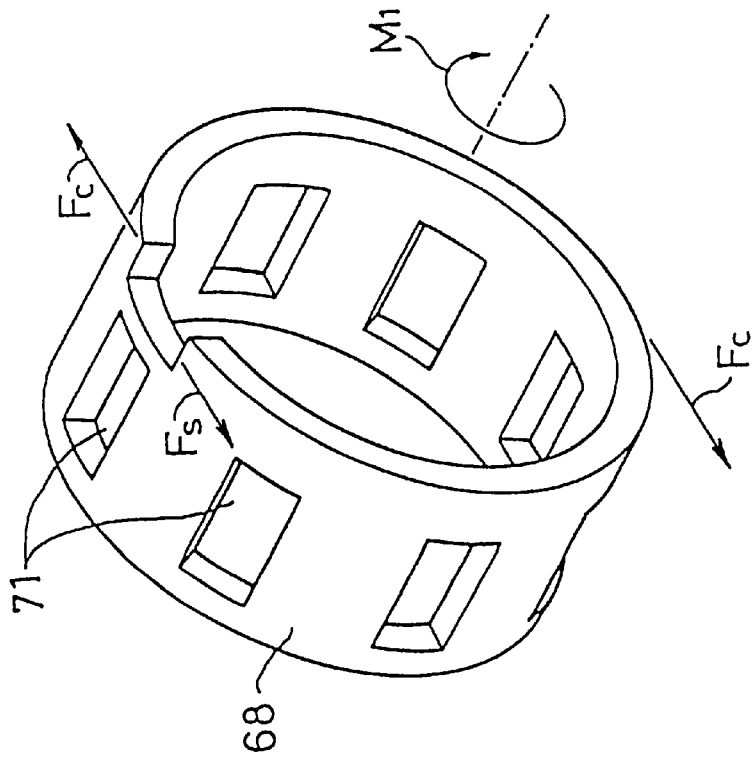
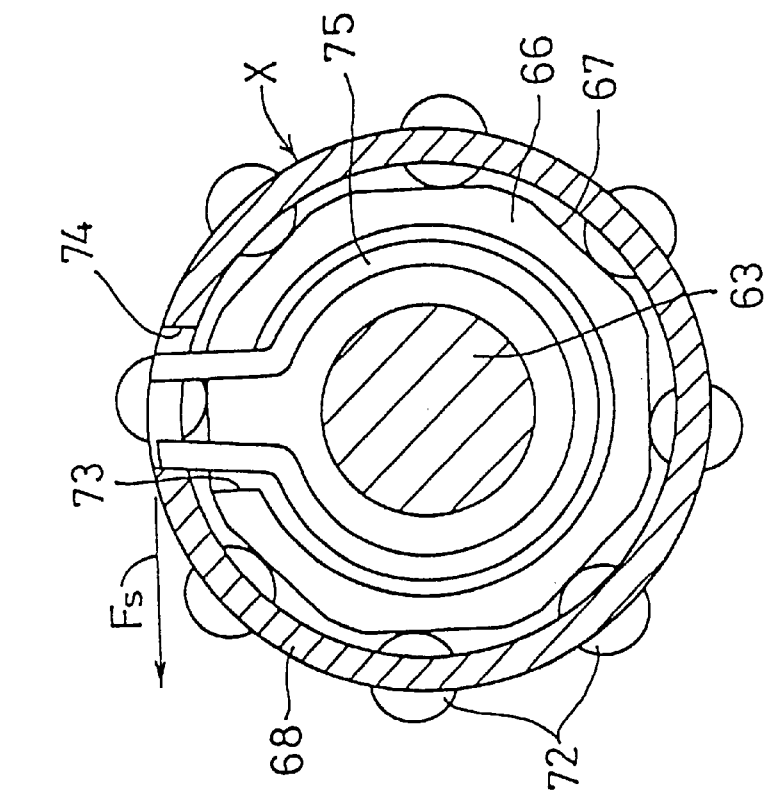
FIG. 8A
FIG. 8B

FOUR-WHEEL DRIVE SYSTEM

BACKGROUND OF THE INVENTION

This invention relates to a four-wheel drive system mounted in a power train of a vehicle for changeover between transmission and non-transmission of driving force.

If a 4WD vehicle turns an a paved road with the front and rear wheels directly coupled together, a phenomenon known as tight corner braking will occur. In order to prevent such a phenomenon, rotation transmission devices having a roller type two-way clutch and an electromagnetic coil are known.

The rotation transmission device A shown in FIGS. 12 and 13 is one of them. This device is mounted in a transfer case 5 of an FR-based 4WD vehicle carrying hub clutches 2 at the front wheels 1 and having an input shaft 6 extending through the transfer case 5 from the transmission 4 coupled to the engine 3 to the rear propeller shaft 8 for the rear wheels 7 so that the entire output is directly transmitted to the rear propeller shaft 8. It comprises a roller type two-way clutch 10 for selectively coupling and uncoupling the input shaft 6 to a chain sprocket 9 coaxially and relatively rotatably mounted on the input shaft 6, and an electromagnetic clutch 11 for locking and unlocking the clutch 10. The rotation transmission device provides a 4WD AUTO (control) mode besides conventional typical part-time 4WD modes (2WD, 4WD-Hi, 4WD-Lo).

FIGS. 14A and 14B show in detail the two-way clutch 10 and the electromagnetic clutch 11 of the rotation transmission device A. The two-way clutch 10 comprises an inner member 12 mounted on the shaft 6 and an outer ring 13 mounted on the inner member 12 through bearings so as to be coaxial with and rotatable relative to the inner member 12. The inner member 12 or the outer ring 13 is formed with a plurality of cam faces 14 provided opposite a cylindrical face 15 formed in the other of the inner member 12 and the outer ring 13 to define a wedge-like space therebetween. Inserted in the wedge-like space is a retainer 16 having a plurality of pockets in which are received engaging elements in the form of rollers 17. A switch spring 18 is held by the retainer 16 and the inner member 12 or outer ring 13 that is formed with the cam faces 14 to bias the retainer 16 to a neutral position in which the rollers 17 engage neither the cylindrical face 15 nor the cam faces 14.

The electromagnetic clutch 11 comprises a friction flange 19 fixed to the outer ring 13 or the inner member 12, an armature 20 provided at one end of the retainer 16 in juxtaposition with the flange 19 with a gap therebetween so as to be slidable but nonrotatable relative to the retainer 16, and an electromagnetic coil 21 for magnetically pressing the friction flange 19 and the armature 20 against each other. By turning on or off the electromagnetic coil 21, the rollers 17 are engaged or disengaged.

This system further includes rotation sensors a and b (FIG. 12) for detecting the rotation speeds of the front and rear wheels or the front and rear propeller shafts. While a mode changeover switch 22 is at the AUTO mode position, if an ECU (controller) 23 detects that one or both rear wheels 7 are slipping based on the signals from the sensors a, b, it applies a current to the electromagnetic coil 21 in real time to lock the two-way clutch 10.

FIG. 15 shows a basic control logic in a system of this type while the vehicle is accelerating during AUTO mode. In the system, if the rotating speed of the rear wheels 7 exceeds that of the front wheels 1 by more than a predetermined value, the ECU 23 supplies a current to the electromagnetic coil 21. In FIG. 15, Vf represents front revolution speed, Vr represents rear revolution speed, B represents brake actuation, ABs represents ABS actuation, Vo represents set value 1 (front-rear rotation speed differences), and Δ Vo represents set value 2 (rear wheel acceleration).

In such a system, during LOCK mode (4WD-Hi, 4WD-Low), a current is continuously supplied to the electromagnetic coil 21 to keep the two-way clutch 10 locked, thereby keeping the front and rear wheels 1, 7 directly coupled together irrespective of how the driver is operating the vehicle. Stable four-wheel drive is thus possible.

In such a conventional control system, the ECU 23 attempts to lock the two-way clutch 10 by applying a voltage to the coil 21 after a larger-than-threshold slip of a rear wheel has been detected. The two-way clutch 10 can not lock up instantly upon application of the voltage but only after a certain time period. Due to this time lag, if the vehicle is started sharply on a low-$\mu$ road such as a frozen road and a rear wheel spins as a result, the rotation speed difference between the front and rear vehicle wheels may grow large by the time the clutch 10 locks. Thus a large shock may be produced when the clutch 10 locks up.

Also, in a conventional system, during LOCK mode, it is necessary to keep supplying a current to the electromagnetic coil 21 even while the vehicle is at stopped with only the engine idling because the ECU cannot anticipate when the driver will start the vehicle moving. This means that a current is continuously supplied to the coil 21 even when the driver stops the car for a long time with only the engine idling or while he is out of the car. This is not only a waste of energy but can overheat the coil 21.

An object of this invention is to provide a four-wheel drive system which can reduce the shock when the two-way clutch locks up after the vehicle has started sharply on a low-$\mu$ road.

Another object is the provision of a four-wheel drive system that consumes less power.

The applicant of this invention proposed another rotation transmission device having rollers as engaging elements in Japanese patent publication 10-53044.

This rotation transmission device B, shown in FIG. 16, includes a two-way clutch 39 comprising an outer ring 32 having an inner cylindrical surface 34, an input shaft 33 (camshaft) inserted through the outer ring 32 and having cam surfaces 35 opposite the cylindrical surface 34 to define wedge-like spaces therebetween, a retainer 36 mounted in the space defined between the cylindrical surface 34 of the outer ring 32 and the cam surfaces 35 of the inner shaft 33, and rollers 38 received in pockets 37 formed in the retainer 36 and adapted to engage the cylindrical surface 34 and the cam surfaces 35 when the outer ring 32 and the input shaft 33 rotate relative to each other. As shown in FIG. 18, the two-way clutch 39 further includes a switch spring 40 urging the rollers 38 to a disengaged, neutral position as shown in FIG. 17. When the rollers 38 are in their neutral position, a gap x is present between each roller 38 and the outer ring 32.

Referring to FIG. 18, the switch spring 40, provided at one end of the retainer 36, has its ends engaged in cutouts 41 and 42 formed, respectively, in the input shaft 33 and the retainer 36, thereby urging the input shaft and the retainer such that their cutouts 41 and 42 align with each other. An input ring 43 is mounted through splines to the input shaft 33. (FIG. 16)

Referring back to FIG. 16, an armature 44 is axially slidably coupled to the other end of the retainer 36 by means of e.g. serrations. The rotation transmission device B further includes an electromagnetic clutch 46 having an electromagnet 45 for pressing the armature 44 against the outer ring 32.

This rotation transmission device is mounted in an FR-based 4WD vehicle on its front propeller shaft 49 connecting a transfer case 48 coupled to the engine transmission to a front differential 47 as shown in FIG. 22, or in an FF-based 4WD vehicle on its rear propeller shaft 52 connecting a center differential 50 of a viscous fluid type or gear type to a rear differential 51 as shown in FIG. 21. In either arrangement, the vehicle is equipped with an ABS, and the rotation transmission has an input ring 43 of the input shaft 33 directly connected to the input side and has its outer ring 32 directly connected to the output side.

In the abovesaid rotation transmission device, the retainer 36 is supported and guided by the outer periphery of the input shaft 33. The cutout 42 is formed in the retainer 36 at its end opposite to the end at which the armature 44 engages. As described above, the ring-shaped switch spring 40 engages this cutout 42 and the cutout 41 of the input shaft 33, thereby urging the retainer and the input shaft such that the cutouts 41 and 42 align with each other.

While the rollers 38 are in their neutral position, the force F of the switch spring 40 acts symmetrically on the retainer 36 as shown by the arrows in FIGS. 19A and 19B, keeping the cutouts 41 and 42 in alignment with each other.

When the elctromagnetic clutch 46 is energized, the armature 44 is brought into frictional contact with the outer ring 32, so that the retainer 36 rotates relative to the input shaft 33. When the retainer rotates even slightly relative to the input shaft, the force of the switch spring 40 acts on the retainer 36 at one point in one direction as shown by the arrow Fs in FIGS. 20A and 20B. At the other end, the force of the armature 44 acts on the retainer 36 in the direction opposite to the direction of the force of the switch spring applied to the retainer as shown by arrows Fc. The forces Fs and Fc cooperate to produce not only moment M1 (intended torque) about the central axis of the retainer, but also unintended moment M2 about an axis perpendicular to the central axis. The moment M1 alone acts as a force to rotate the retainer about its central axis. But the combined force of the two moments M1 and M2 tends to cause the retainer to incline or get out of alignment. This combined force is borne by the contact portion between the retainer and the input shaft 3, thus increasing the friction between the input shaft and the retainer. This makes it increasingly difficult for the retainer to rotate about its central axis relative to the input shaft.

This in turn makes it difficult to move the rollers 8 smoothly from the neutral to engaging position and vice versa.

Thus another object of this invention is to provide a rotation transmission device that ensures smooth and accurate movement of the retainer while preventing magnetic leakage.

SUMMARY OF THE INVENTION

According to this invention, there is provided a four-wheel drive system comprising a rotation transmission device for changeover between 2WD and 4WD mounted in a transfer case for an FR-based 4WD vehicle having an input shaft for transmitting the output from a transmission directly to a propeller shaft for rear vehicle wheels, and capable of distributing the output to a propeller shaft for front vehicle wheels, or on a front wheel drive train of the 4WD vehicle, the rotation transmission device comprising a two-way clutch using engaging elements, and a current control means for controlling the locking and freeing of this two-way clutch, characterized in that a current to the current control means is controlled according to an input signal from a sensor indicating a load on an engine.

According to this invention, there is also provided a rotation transmission device comprising an outer ring, an input shaft provided in the outer ring, one of the outer ring and the input shaft having a cylindrical face and the other having a plurality of cam faces opposite the cylindrical face, a retainer mounted between the outer ring and the input shaft and having pockets, a plurality of rollers received in the pockets and adapted to engage between the cylindrical face and the cam faces when the outer ring rotates relative to the input shaft, an elastic member mounted between the retainer and the outer ring or the input shaft for urging the rollers to a disengaging neutral position, an armature coupled to one of two ends of the retainer so as to be axially movable but nonrotatable relative to the retainer, a friction member mounted between the outer ring and the input shaft and fixed to one of the outer ring and the input shaft, a nonmagnetizable flange fixed to the friction member, and an electromagnet mounted between the outer ring and the input shaft for attracting the armature, the armature being mounted between the frictional surface of the friction member and the flange with axial play, the elastic member engaging the retainer at one of the two ends of the retainer adjacent the armature.

Other features and objects of the present invention will become apparent from the following description made with reference to the accompanying drawings, in which:

BRIEF DESCRIPTION OF THE DRAWINGS

FIGS. 8A and 8B are a sectional view and a perspective view, respectively, showing how the moment from the switch spring acts on the retainer;

DETAILED DESCRIPTION OF THE PREFERRED EMBODIMENT

Embodiment of this invention are described with reference to the drawings.

Figure 1:
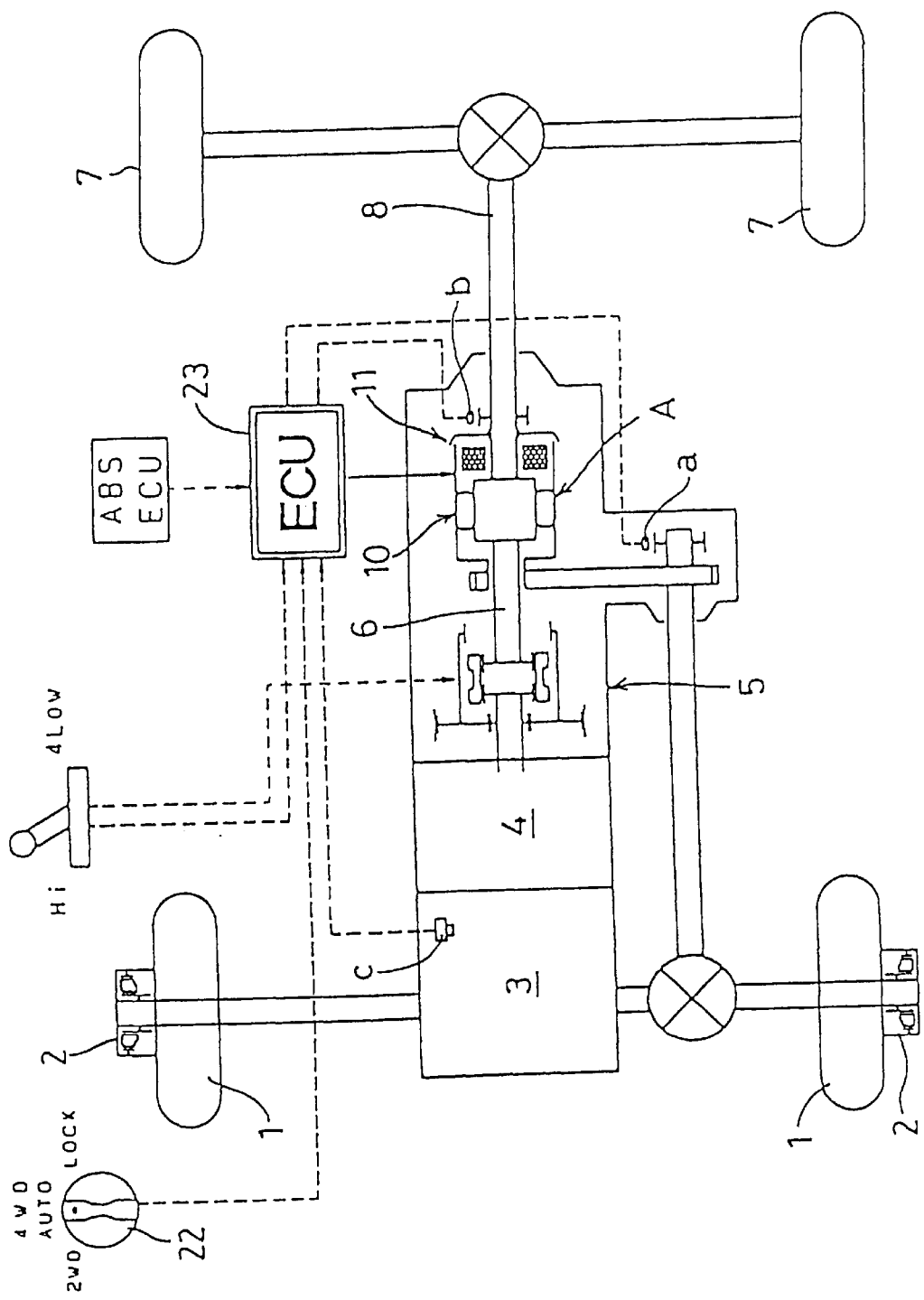
FIG. 1 is a view showing the layout of a 4WD vehicle carrying a rotation transmission device.
Figure 2:
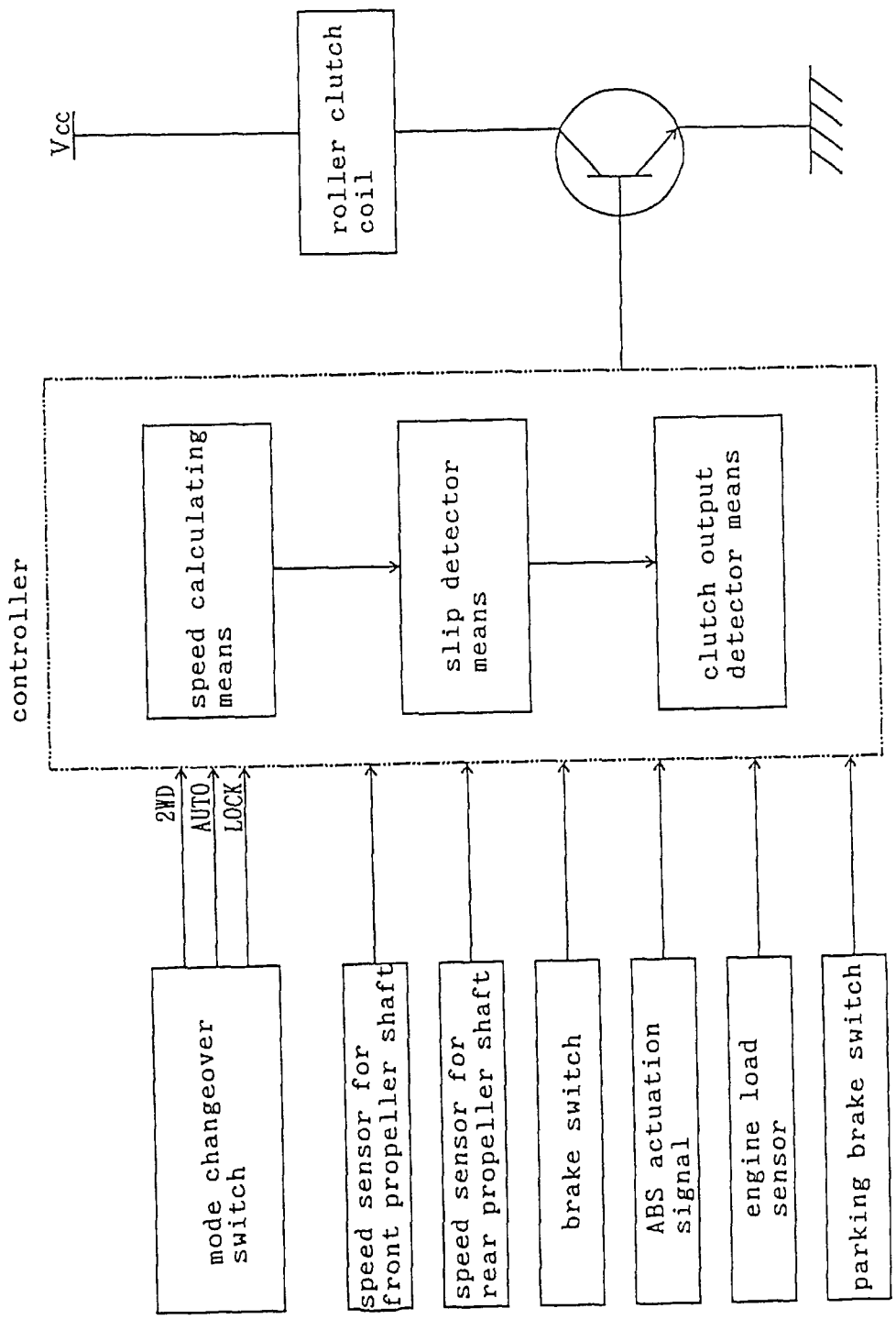
FIG. 2 is a block diagram showing a method of controlling the rotation transmission device.
Figure 12:
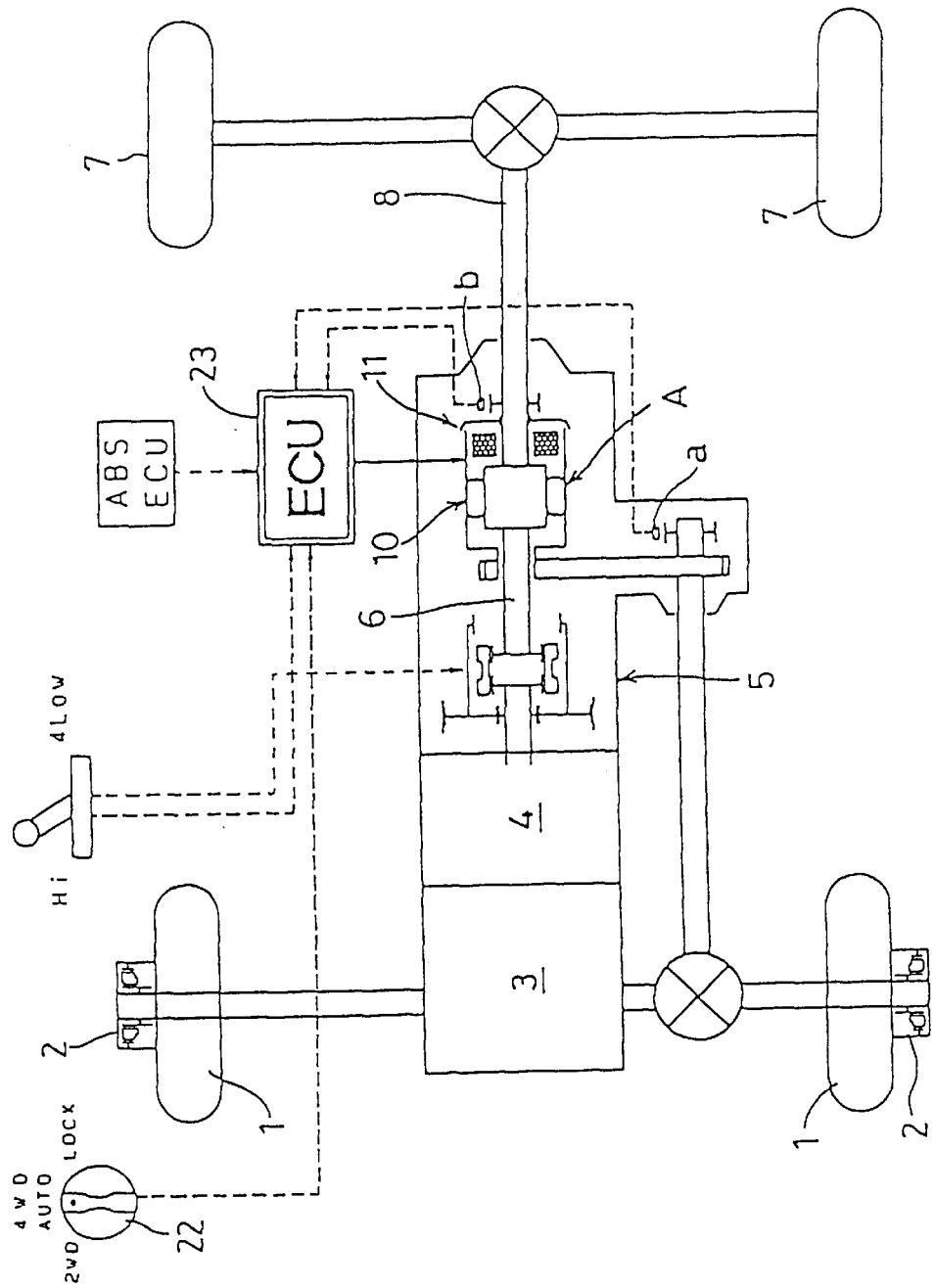
FIG. 12 is a view showing a conventional layout of a 4WD vehicle carrying a rotation transmission device.
Figure 13:
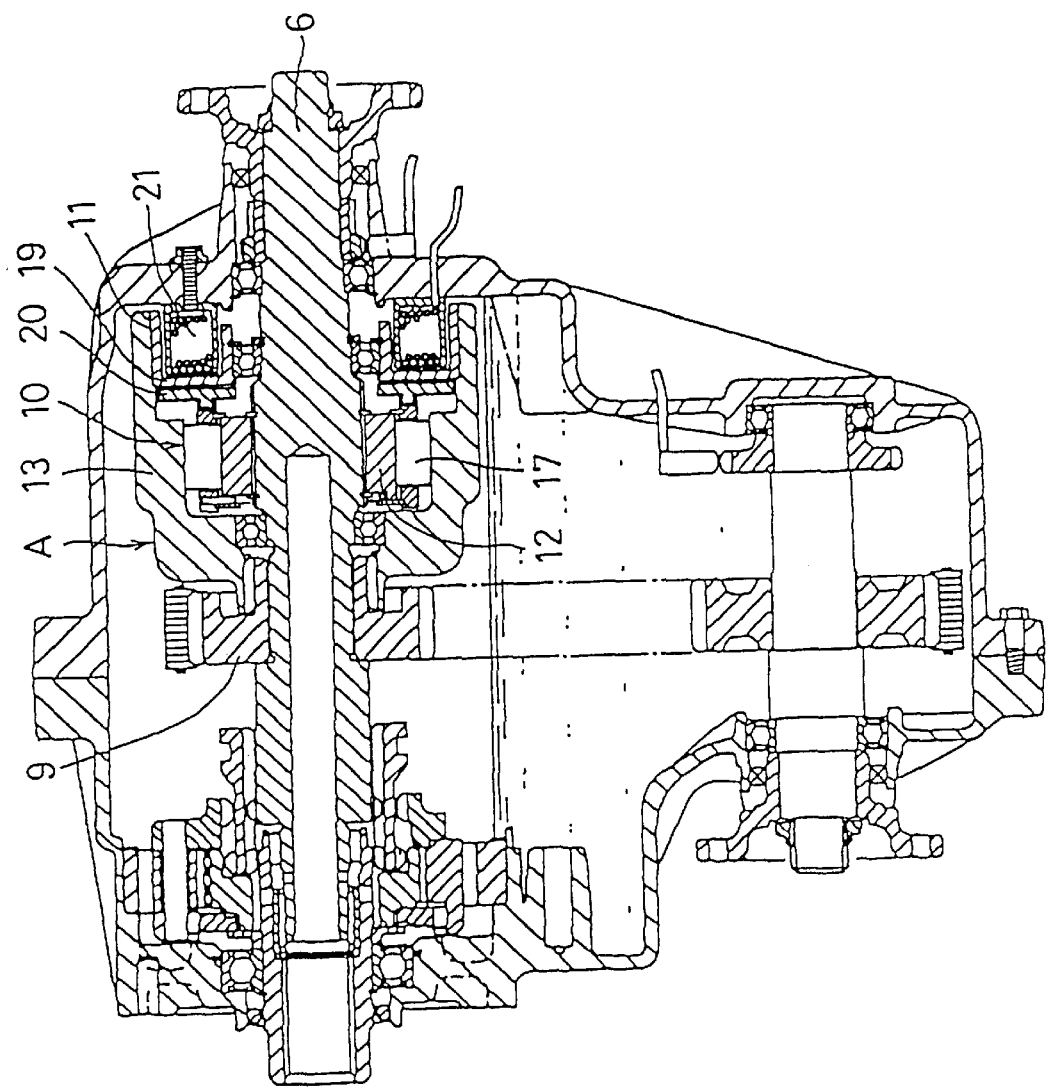
FIG. 13 is a sectional view of a transfer case in which is mounted the rotation transmission device.
Figure 14A:
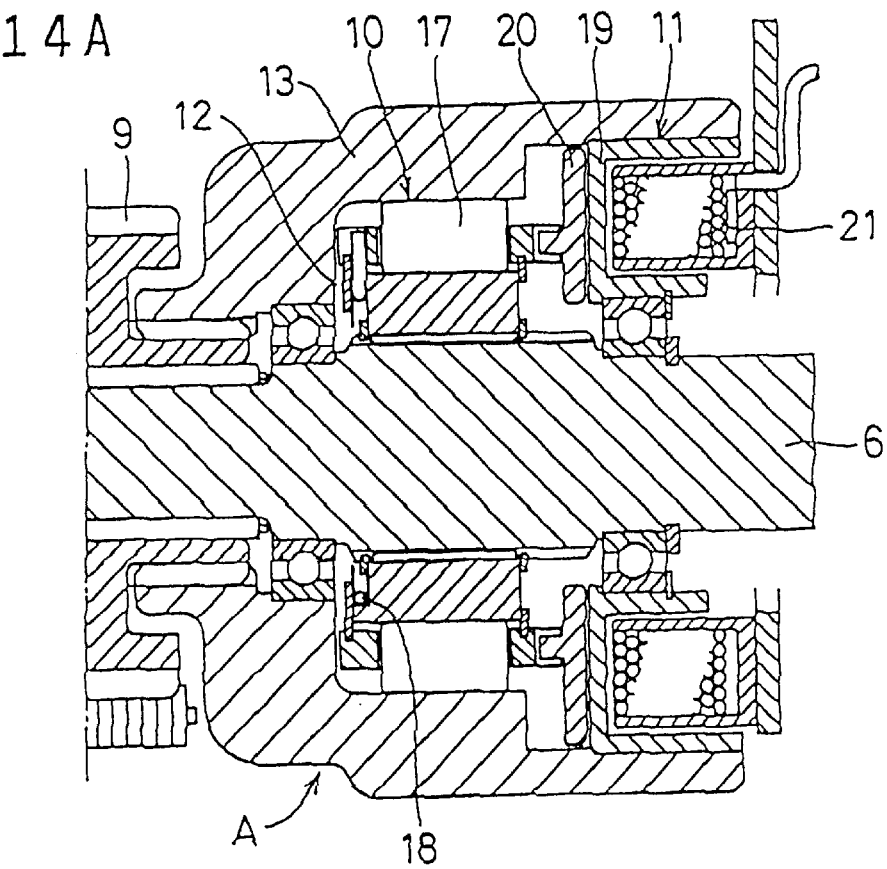
FIG. 14A is a vertical sectional front view of the rotation transmission device.
Figure 14B:
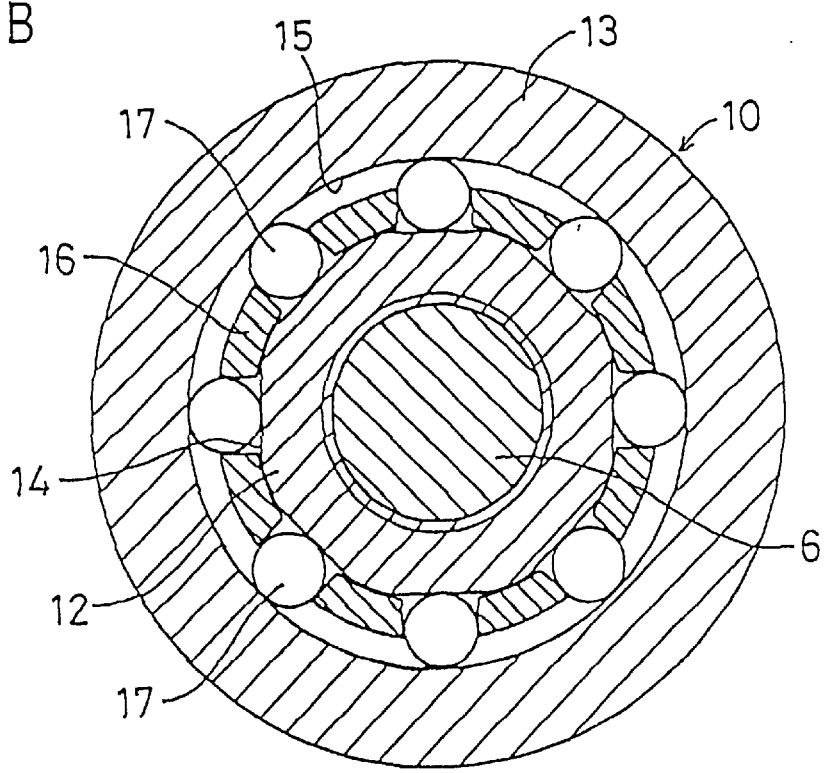
FIG. 14B is a vertical sectional side view of the same.
Figure 15:
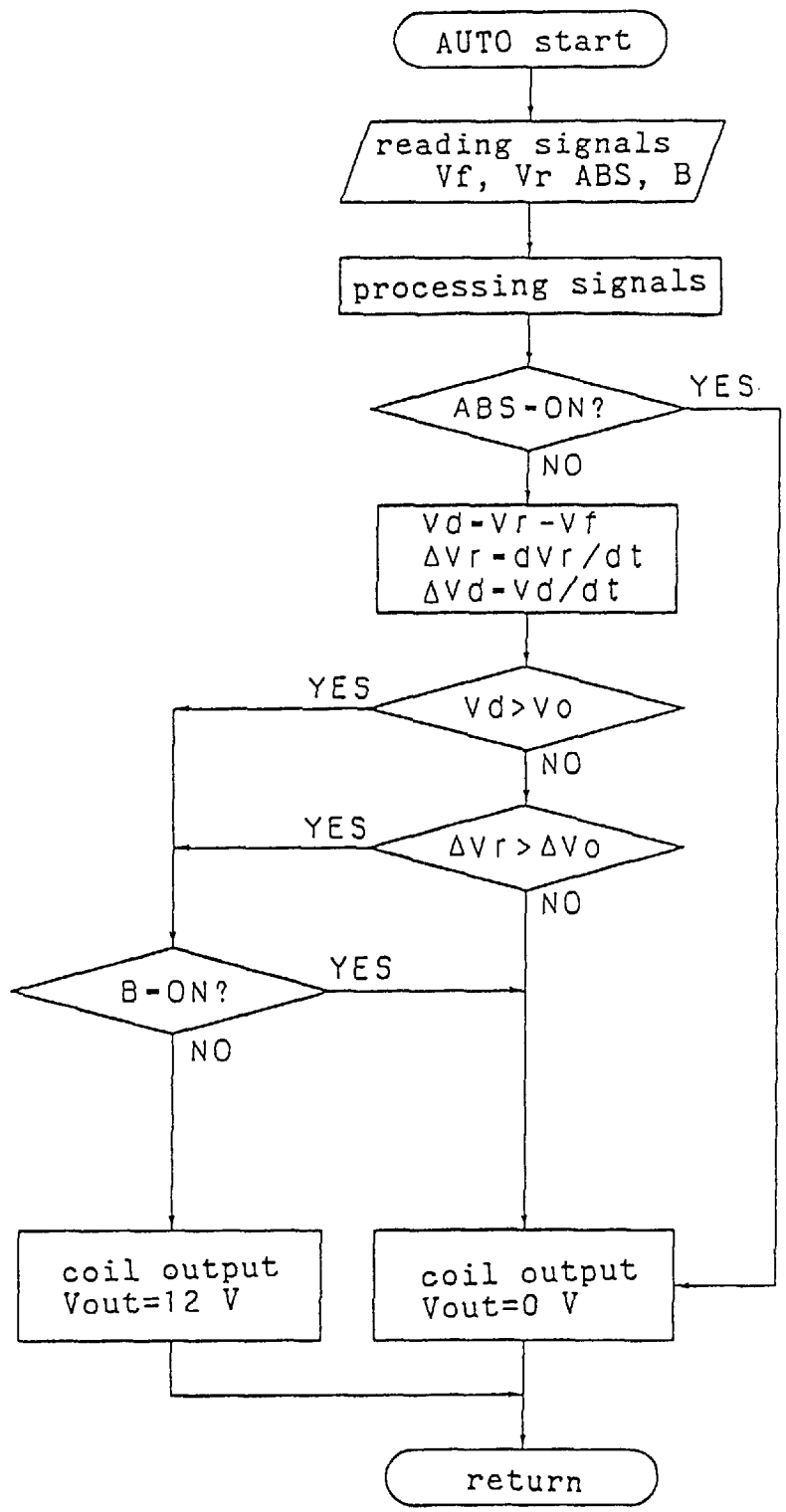
FIG. 15 is a flowchart showing a conventional method for controlling the rotation transmission device.
Figure 16:
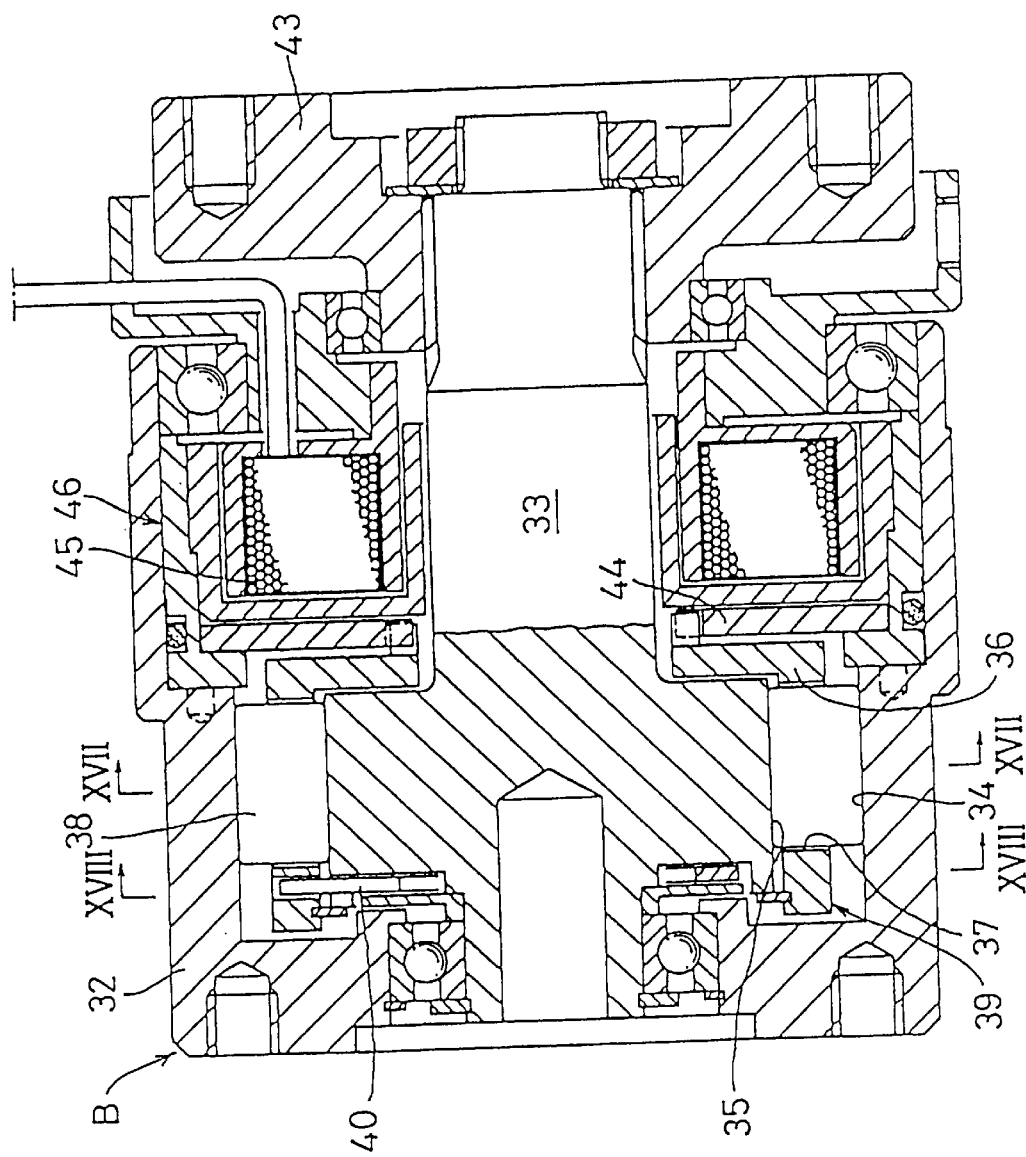
FIG. 16 is a vertical sectional view of a conventional rotation transmission device.

Structurally, the rotation transmission device of the embodiment is the same as the one shown in FIGS. 12 and 13 except one point. In the system embodying the present invention, as shown in FIGS. 1 and 2, a sensor c is connected to the ECU 23 for detecting the load on the engine 3.

Figure 3:
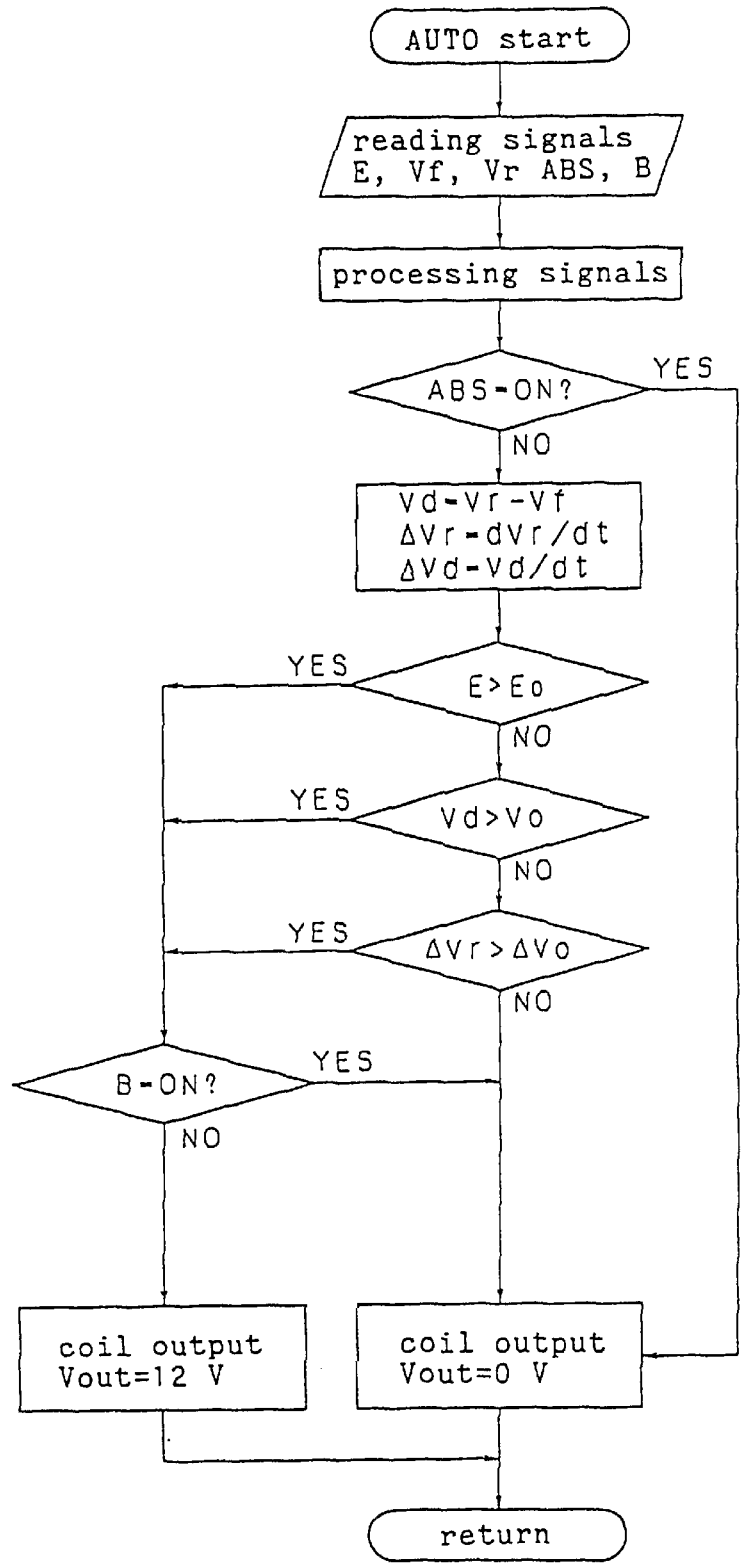
FIG. 3 is a flowchart showing the method of controlling the rotation transmission device.

When the driver steps on the accelerator to accelerate the vehicle, the engine load increases in proportion to the degree of acceleration. The ECU 23 is programmed in AUTO mode as shown in FIG. 3. That is, when the ECU detects that the output voltage of the engine load detecting sensor c has exceeded a threshold, it determines that the driver is trying to accelerate sharply before it detects that the rear wheels 7 are not slipping, and supplies a current to the electromagnetic coil 21 to lock the two-way clutch 10 and change over to 4WD at an earlier stage. In FIG. 3, E represents engine load, Vf represents front revolution speed, Vr represents rear revolution speed, B represents brake acuation, ABS represents ABS actuation, Vo represents set value 1 (front-rear speed differences), Δ Vo represents set value 2 (rear wheel acceleratoin) and Eo represents set value 3 (engine load).

With an automatic-transmission vehicle, a time lag is especially large until the torque is actually transmitted to the rear vehicle wheels after the accelerator has been depressed. This time lag makes it possible to change over to 4WD mode by locking the two-way clutch 10 well before a rear wheel 7 slips. This makes it possible to smoothly accelerate the vehicle without giving passengers shocks or any other uncomfortableness.

While the vehicle is turning a corner on a paved road at a high acceleration, the rear wheels 7 tend to slip, i.e. rotate faster than the front wheels due to a high engine load. Thus, no tight corner braking will occur. If the driver stops accelerating in this state, the output of the engine load detecting sensor c drops below the threshold, so that the ECU 23 stops supplying a current to the electromagnetic coil 21 to unlock the two-way clutch 10. Thus, tight corner braking will not occur in this state, either.

A set value in conventional control logic of FIG. 3 in which the clutch 10 is locked based on the rotation speed difference between the front and rear wheels may be changed dependent upon the output level of the load sensor c.

As the engine load detecting sensor c, an air flow meter for measuring the amount of air inhaled into the engine may be used. An air flow meter is a potentiometer which detects the amount of inhaled air in terms of a voltage ratio. The engine load is determined based on the voltage ratio.

The engine load may also be determined based on the negative pressure in the intake manifold at its portion downstream of the throttle valve as measured by a negative pressure sensor.

Figure 4:
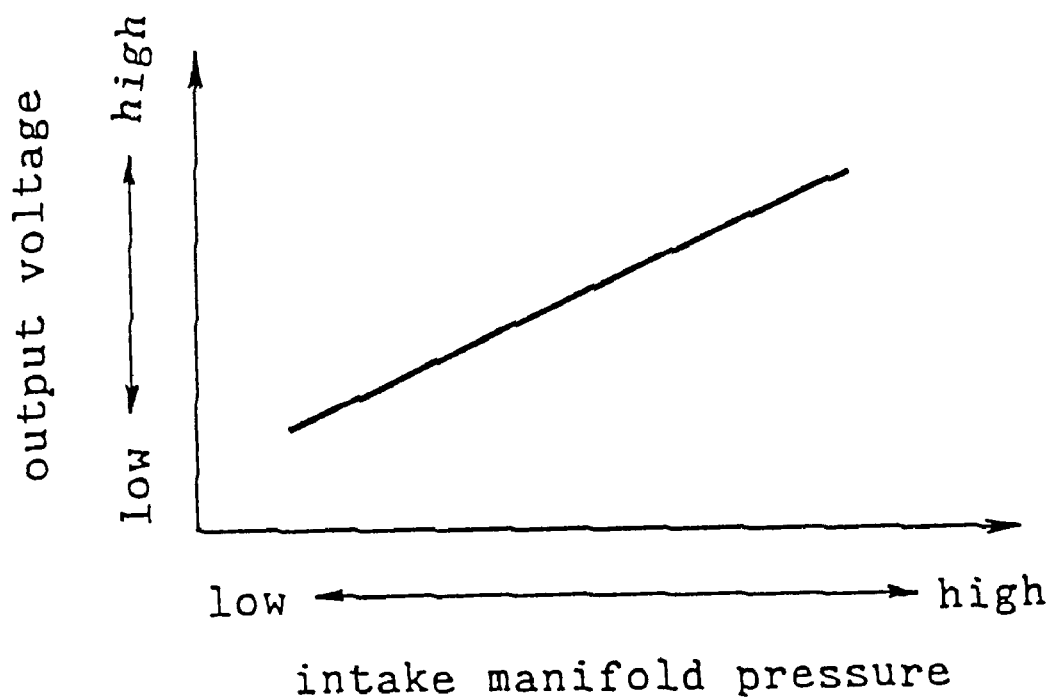
FIG. 4 is a gragh showing the output characteristics of an engine-mounted sensor.

FIG. 4 shows the output characteristics of a negative pressure sensor. If the driver depresses the accelerator to the floor, the pressure in the intake manifold increases to a value near the atmospheric pressure, and the output voltage of the negative pressure sensor increases.

When the accelerator is released, the pressure in the intake manifold drops to a vacuum, so that the output voltage of the sensor drops.

As the engine load detecting sensor, a sensor for detecting the degree of opening of the accelerator throttle valve may be used. This sensor is a potentiometer that outputs a voltage proportional to the degree of opening of the throttle valve.

Other sensors usable as the engine load detecting sensor include an accelerator stroke sensor for detecting the stroke position of the accelerator and converting it into a voltage signal, and an accelerator switch for detecting a predetermined position of an accelerator.

An engine revolution speed sensor (crank angle sensor) may be used to determine that the vehicle is accelerating sharply based on the difference between the engine revolution speed and the wheel speed.

These sensors may be either analog or digital ones, and also may be of a kind that outputs a signal in a stepwise manner for each band of a suitable width, or of a type that outputs a logic signal when a predetermined value is reached.

One such engine load sensor may be used, or if higher accuracy is needed, a plurality of them may be used.

Many 4WD vehicles have such an engine load sensor used to control the engine and/or transmission. In such a case, these sensors can be used for the system of this invention and thus there is no need to provide additional such sensors.

The output of these sensors may be directly entered into the ECU 23 of the 4WD system of this invention, or may be entered into e.g. an engine-controlling ECU first where converted to a suitable signal and then entered into the ECU 23.

With a manual-transmission vehicle, the driver may depress only the accelerator without engaging the clutch when he has no intention of moving the vehicle. In such a case, the vehicle remains stationary. Thus, only the engine load sensor cannot accurately determine if the driver is intending to start the vehicle.

Thus, if the system is used for an MT vehicle, it is preferable to provide e.g. a position sensor at an operating portion of the clutch pedal or the dry clutch. In this arrangement, the ECU controls the system dependent upon the information from the engine load sensor only while the voltage signal from the position sensor is indicating that the two-way clutch 10 is in engagement.

The engine load sensor also enables the ECU to detect that the engine has stalled based on its output voltage.

If the engine should stall while the vehicle is travelling, the ECU instantly knows this fact through the sensors c, so that it is possible to instantly disengage the two-way clutch (and thus to change over to 2WD mode, which is more stable during an engine stall situation) by stopping the supply of current to the electromagnetic coil 21 irrespective of what drive mode is used, and further to turn on a warning lamp on the instrument panel to notify the driver that the engine has stalled.

Of course, an engine stall situation may be reported to the ECU of the present system by inputting a logic signal from the engine-controlling ECU.

When the LOCK mode (4WD-Hi, 4WD Low) is selected by the drive mode changeover switch 22 of the system of the present invention, based on the front and rear wheel rotation speeds and the signal from the engine load sensor c, the ECU 23 determines if the vehicle is at a stop and if no load is acting on the engine or the engine is idling, and if these conditions are met, the supply of current to the electromagnetic coil 21 is cut even during the LOCK mode.

Of course, when the engine accelerates even slightly, this means that the driver intends to start the vehicle, and the output of the engine load sensor c will change before the vehicle wheels begin moving. Thus, when this is detected, a current is again continuously supplied to the electromagnetic coil 21.

While the vehicle is travelling, when the rotation sensors a, b for the front and rear vehicle wheels 1, 7 are producing signals, a current is continuously supplied irrespective of the output level of the engine load sensor to maintain direct-connect 4WD.

By this control, power is not consumed when the driver has no intention of moving the vehicle even during the LOCK mode. This is economical.

Figure 23:
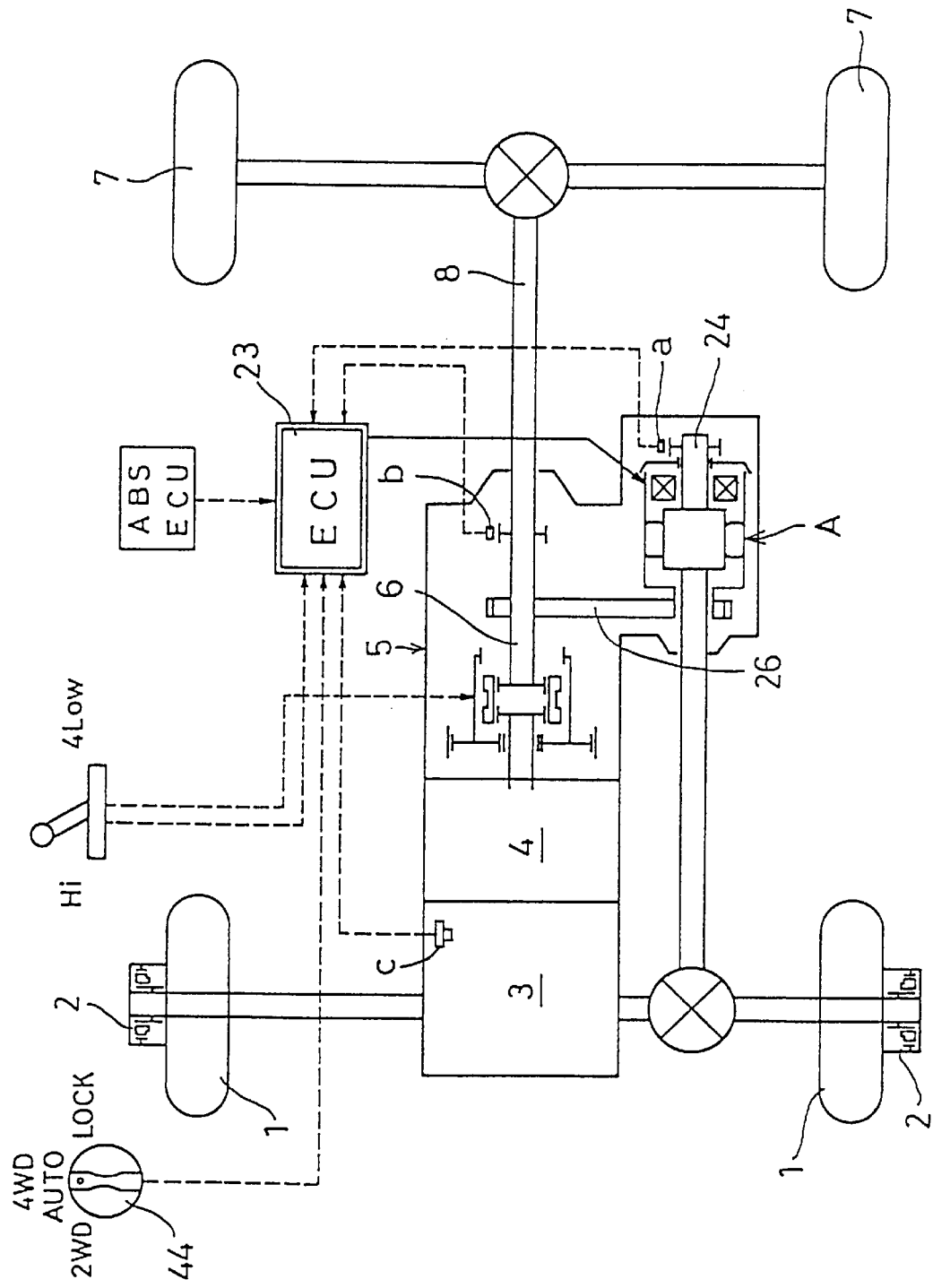
FIG. 23 is a view similar to FIG. 1 but of an alternate embodiment.

FIG. 23 shows an alternate embodiment in which the rotation transmission device is mounted not on the input shaft 6 as shown in FIG. 1 but on the front propeller shaft 24 in exactly the same way as it is mounted on the input shaft. In this embodiment, the outer ring of the two-way clutch is coupled to a sprocket rotatably mounted on the front propeller shaft 24 and drivingly coupled to another sprocket nonrotatably mounted on the input shaft 6 through a silent chain 26.

FIGS. 5–8 show an embodiment of the rotation transmission device. The rotation transmission device 61 of this embodiment includes an outer ring 62 as a driven member and an input shaft 63 rotatably supported in the outer ring 62 through bearings. Mounted between the outer ring 62 and the input shaft 63 are a two-way clutch X and an electromagnetic clutch Y for locking and unlocking the two-way clutch X. At one end of the input shaft 63, an input ring 64 is mounted through splines.

The two-way clutch X has a cylindrical face 65 formed on the inner periphery of the outer ring 62, and a plurality of flat cam faces 67 formed on the outer periphery of a large-diameter portion 66 of the input shaft 63. A wedge space narrowing toward both ends is defined between each cam face 67 and the cylindrical face 65.

A retainer 68 is mounted between the outer periphery of the large-diameter portion 66 of the input shaft 63 and the inner cylindrical face 65 of the outer ring 62. The retainer 68 has its both ends rotatably supported on the input shaft 63 through plates 69 and 70.

Figure 6:
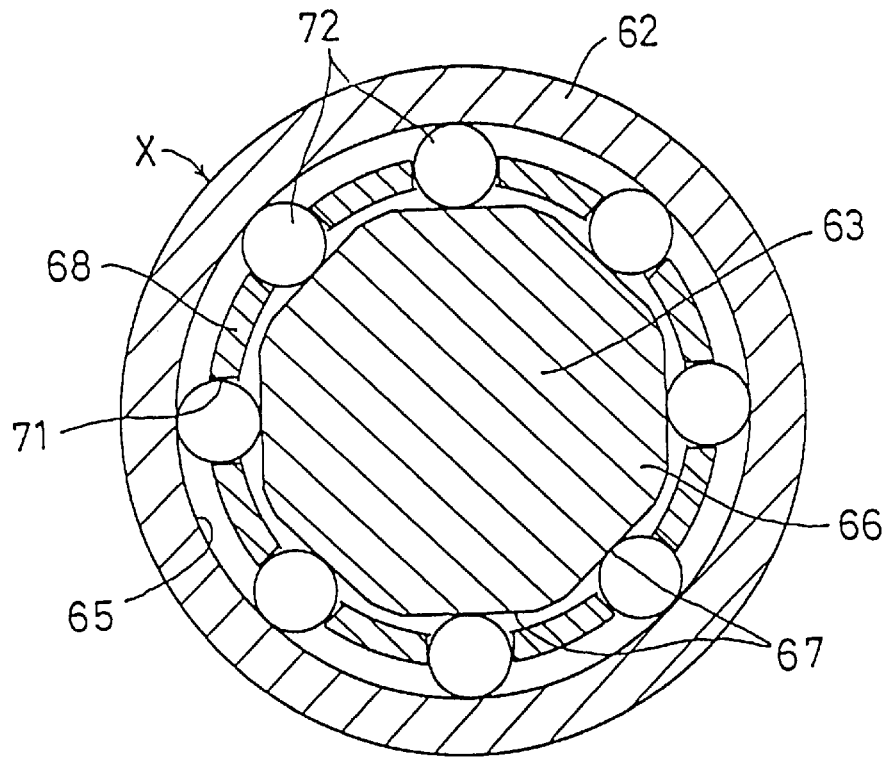
FIG. 6 is a sectional view taken along line VI—VI of FIG. 5.

As shown in FIG. 6, the retainer 68 has as many circumferentially arranged pockets 71 as cam faces 67. A roller 72 as an engaging element is received in each pocket 71 and supported on each cam face 67. When moved a predetermined distance by the retainer 68, the rollers 72 engage between the cam faces 67 and the cylindrical face 65, thus interlocking the outer ring 62 and the input shaft 63.

Figure 7:
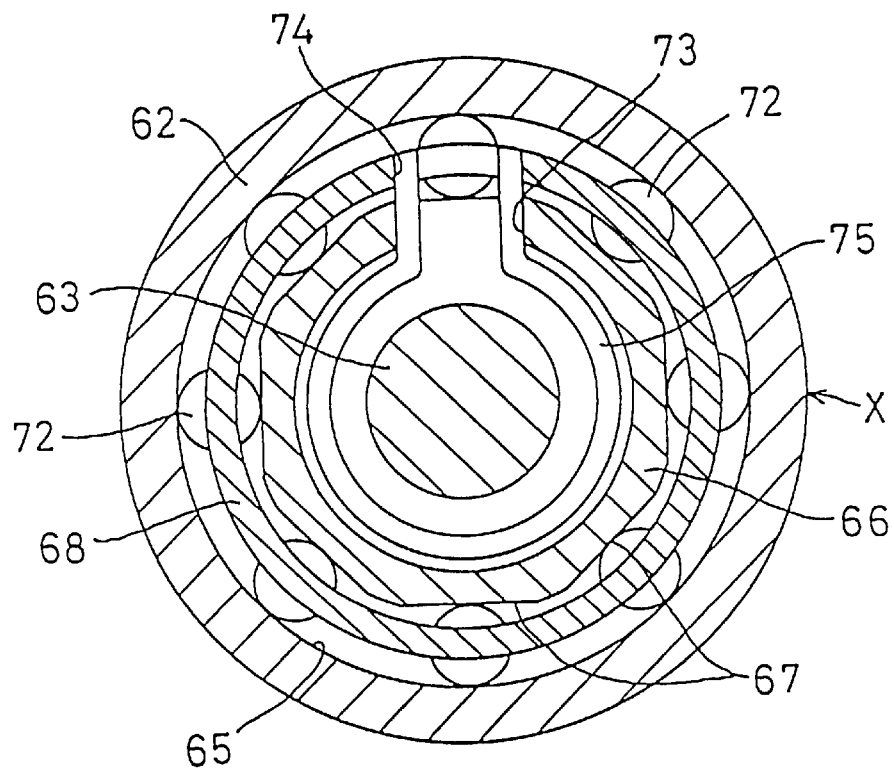
FIG. 7 is a sectional view taken along line VII—VII of FIG. 5.

As shown in FIG. 7, the retainer 68 and the input shaft 63 have cutouts 73 and 74, respectively. An elastic member or switch spring 75 has its both ends engaged in the cutouts 73, 74. The cutouts are formed therein at their end adjacent an armature to be described later.

Figure 17:
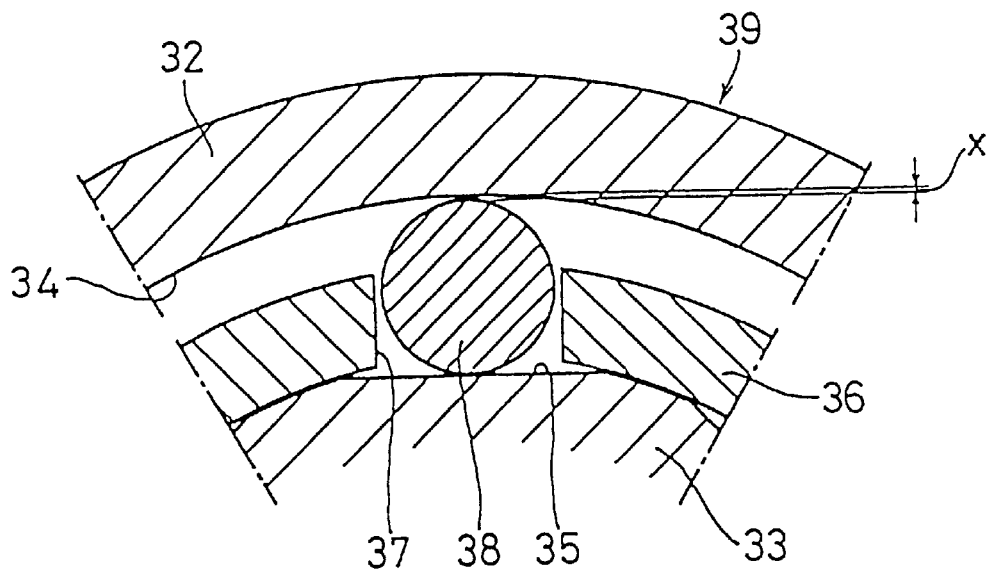
FIG. 17 is an enlarged sectional view taken along line XVII—XVII of FIG. 16.
Figure 18:
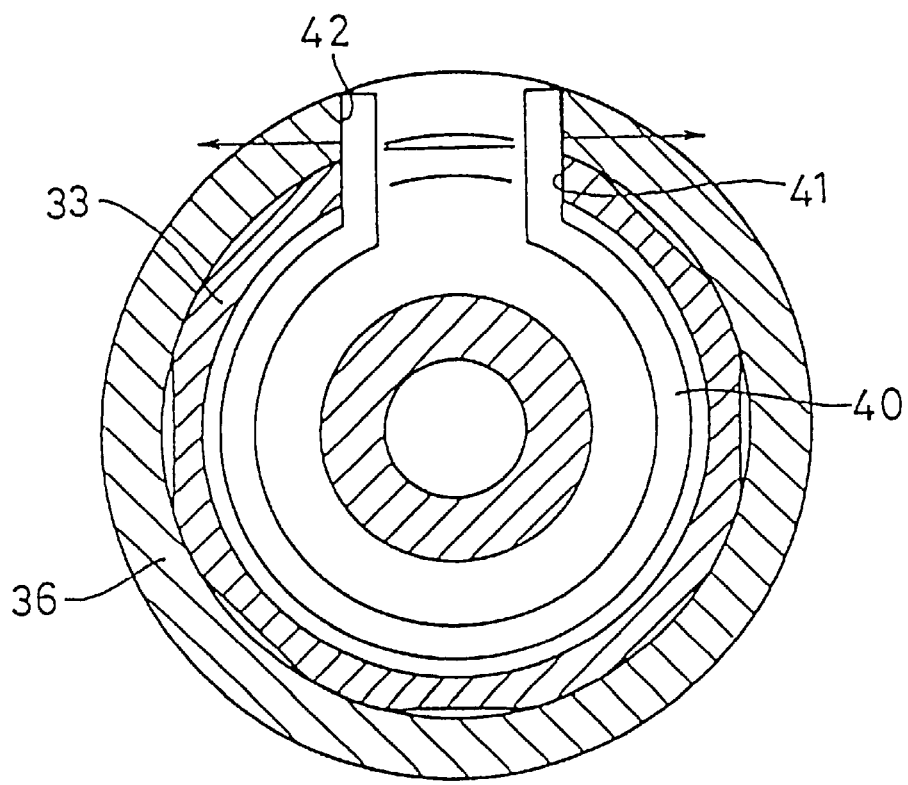
FIG. 18 is a setional view taken along line XVIII— XVIII of FIG. 16.
Figure 19A:
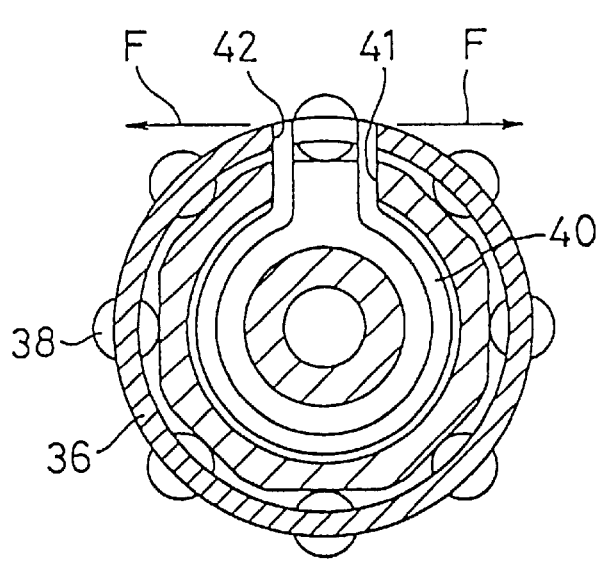
FIGS. 19A and 19B are a sectional view and a perspective view showing how the moment from the switch spring acts on the retainer in the conventional rotation transmission device during two-wheel drive mode.
Figure 19B:
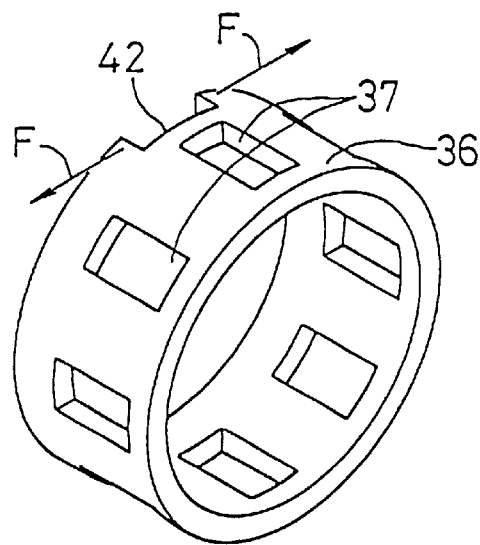
Figure 20A:
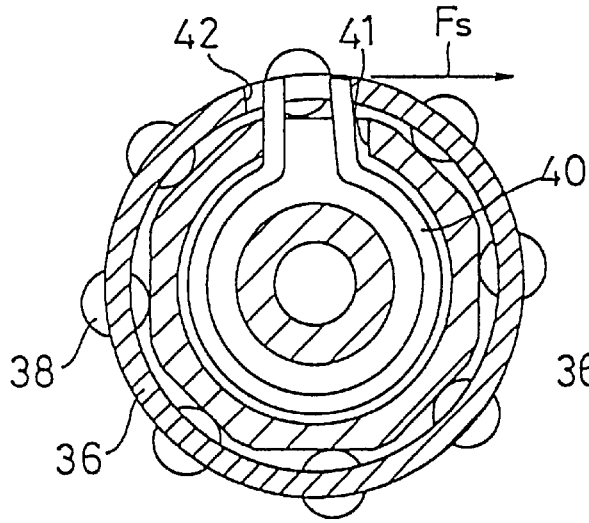
FIGS. 20A and 20B are a sectional view and a perspective view, similar to FIGS. 19A and 19B, but during four-wheel drive mode.
Figure 20B:
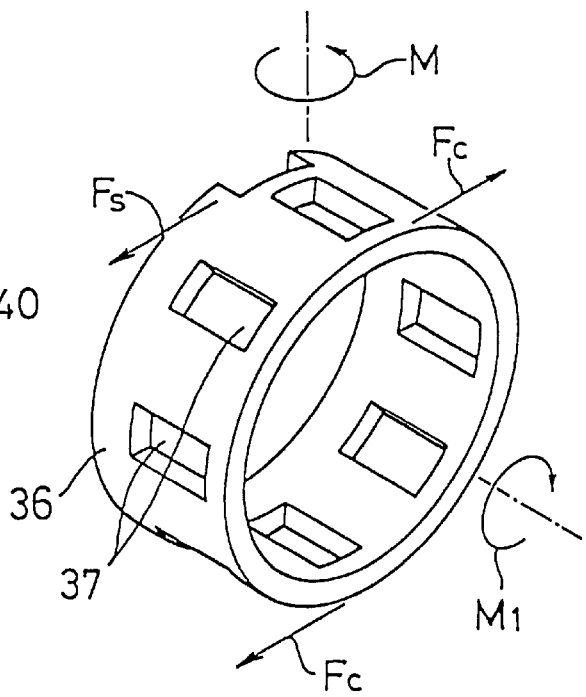
Figure 22:
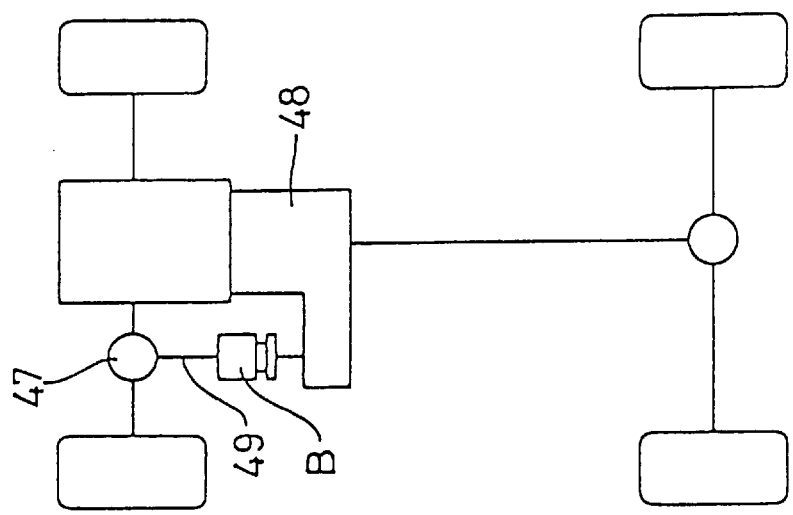
FIG. 22 is a plan view of a rotation transmission device as mounted on another 4WD system.
Figure 21:
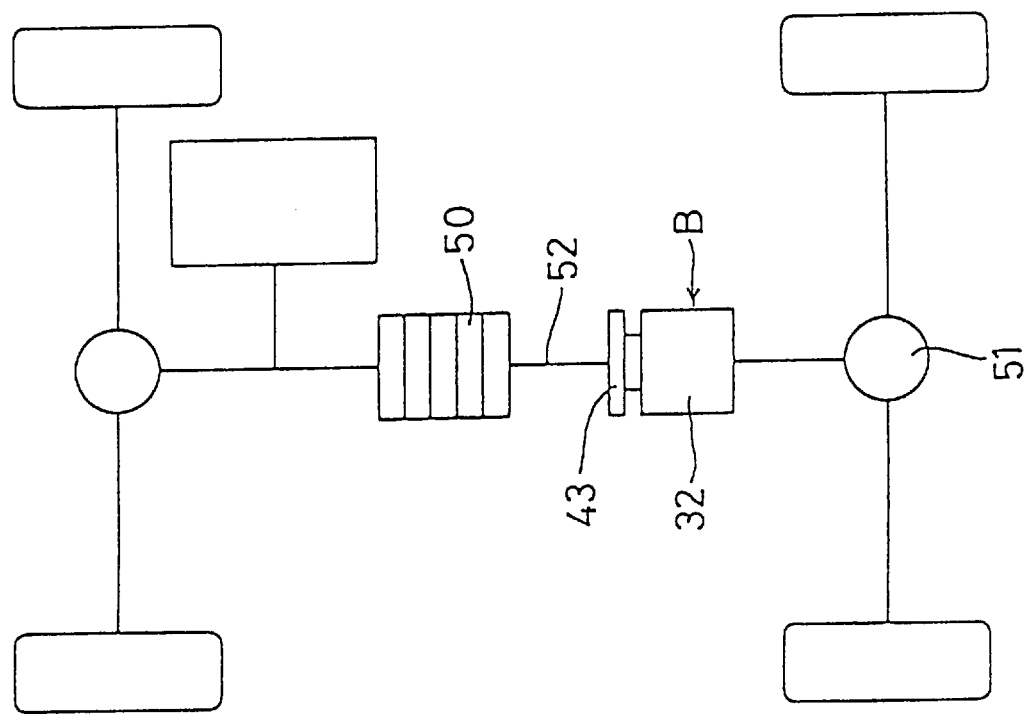
FIG. 21 is a plan view of a rotation transmission device as mounted on a 4WD system.

When the cutouts 73 and 74 are in alignment, relative positions of the cam faces 67 of the input shaft 63, the pockets 71 of the retainer 68, and the rollers 72 are as shown in FIG. 17, so that a gap is present between each roller 72 and the outer ring 62. In this state, the input shaft 63 and the outer ring 62 are not locked together and are rotatable relative to each other.

Figure 5:
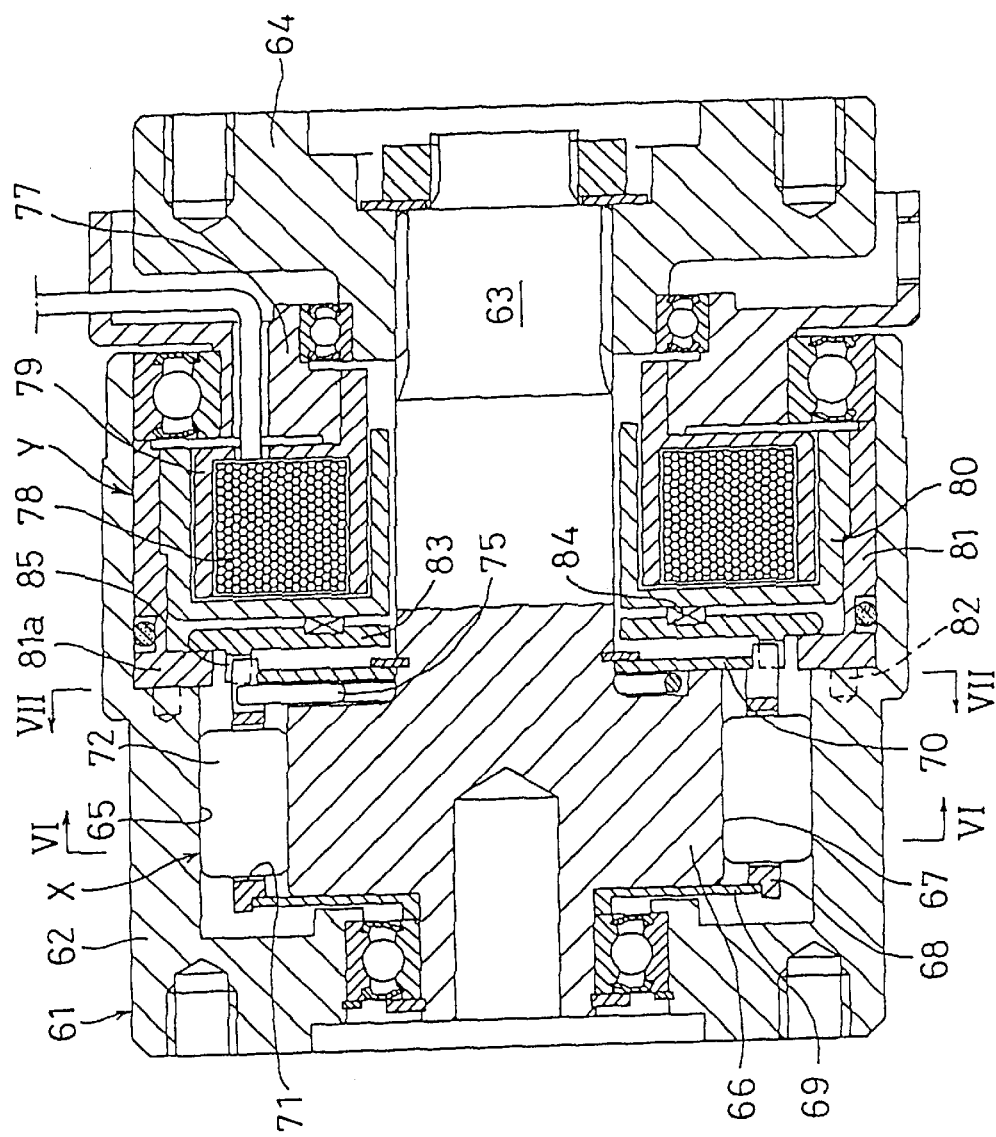
FIG. 5 is a vertical sectional view of a second embodiment of the rotation transmission device.

As shown in FIG. 5, the electromagnetic clutch Y is mounted between the input shaft 63 and the outer ring 62. The electromagnetic clutch Y includes a field core 79 fixedly mounted to a fixed member 77 partially protruding from one end of the outer ring 62, an electromagnetic coil 78 received in the field core 79, and a rotor 80 rotatably mounted on the field core 79 and fixedly pressed into a rotor guide 81 received in the outer ring 62 and held by pins 82 so as to be nonrotatable relative to the outer ring 62.

Thus, the field core 79 is a nonrotatable fixed member, while the outer ring 62, rotor guide 81 and rotor 80 are nonrotatable relative to each other at any time. The rotor 80 is a friction member nonrotatable relative to the outer ring 62.

In the space between the rotor 80 and a flange 81*a* of the rotor guide 81, an armature 83 is loosely received so as to be axially movable and is magnetically attracted by the electromagnetic coil 78 when the latter is energized. A leaf spring 84 is provided between the armature 83 and the rotor 80, lightly urging the armature 83 toward the flange 81*a* of the rotor guide 81.

The rotor guide 81 is made of a nonmagnetizable material such as aluminum or copper. It prevents magnetic leakage to the outer ring 62 by preventing direct contact of the armature 83 with the outer ring 62. This arrangement is necessary because if the maganetic force should leak to the outer ring 62, it might reduce the attracting force or even make it impossible to attract the armature 83.

By loosely mounting the armature 83 between frictional surfaces of the nonmagnetizable member and the rotor 80, it is possible to control the moving distance of the armature 83 and also prevent magnetic leakage to the outer ring 62.

As shown in FIG. 5, the armature 83 has a pair of protrusions 85 extending toward the retainer 68 and engaged in the cutout 74 of the retainer 68 in which are also received the ends of the switch spring 75. The armature is thus axially movable but nonrotatable relative to the retainer 68.

Since the rotor 80 is relatively nonrotatably coupled to the outer ring 62, and the armature 83, which is rotatable relative to the rotor 80, is relatively nonrotatably coupled to the input shaft 63 through the retainer 68 and the switch spring 75, the outer ring 62 and the input shaft 63 are rotatable relative to each other.

In operation, when the electromagnetic coil 78 is not energized, the two-way clutch X is held in its neutral position in which the rollers 72 are not engaging the cam faces 67, the outer ring 62 and the input shaft 63 are not engaged but free. Vehicle-wise, this state is a two-wheel drive mode.

When energized, the electromagnetic coil 78 attracts the armature 83 to press it against the rotor 80, so that the retainer 68 is relatively nonrotatably coupled to the outer ring 62 by the frictional force produced between the armature 83 and the rotor 80. Thus, when the input shaft 63 and the outer ring 62 begin to rotate relative to each other in this state, the rollers 72 move from their neutral position to their engaging position, thereby locking the outer ring 62 and the input shaft 63 together. Four-wheel drive mode thus begins.

When the rollers 72 are moved to the engaging position and the outer ring 62 and the input shaft 63 are locked together by energizing the electromagnetic coil 78, as shown in FIG. 8B, the force Fs of the switch spring 75 acts on the retainer 68 in one direction, while the force Fc from the armature 83 acts on the retainer 68 in the opposite direction. Since the two forces Fs and Fc act on the same axial end of the retainer, no moment about an axis perpendicular to the central axis is produced, so that the retainer 68 can rotate smoothly relative to the input shaft 63 even without requiring any bearing therebetween.

Another advantage of providing the switch spring and the armature at the same axial end of the retainer is that it is possible to engage the ends of the switch spring 75 and the protrusions 85 of the armature 83 in a single cutout formed in the retainer and thus to reduce the machining steps and cost.

Figure 9:
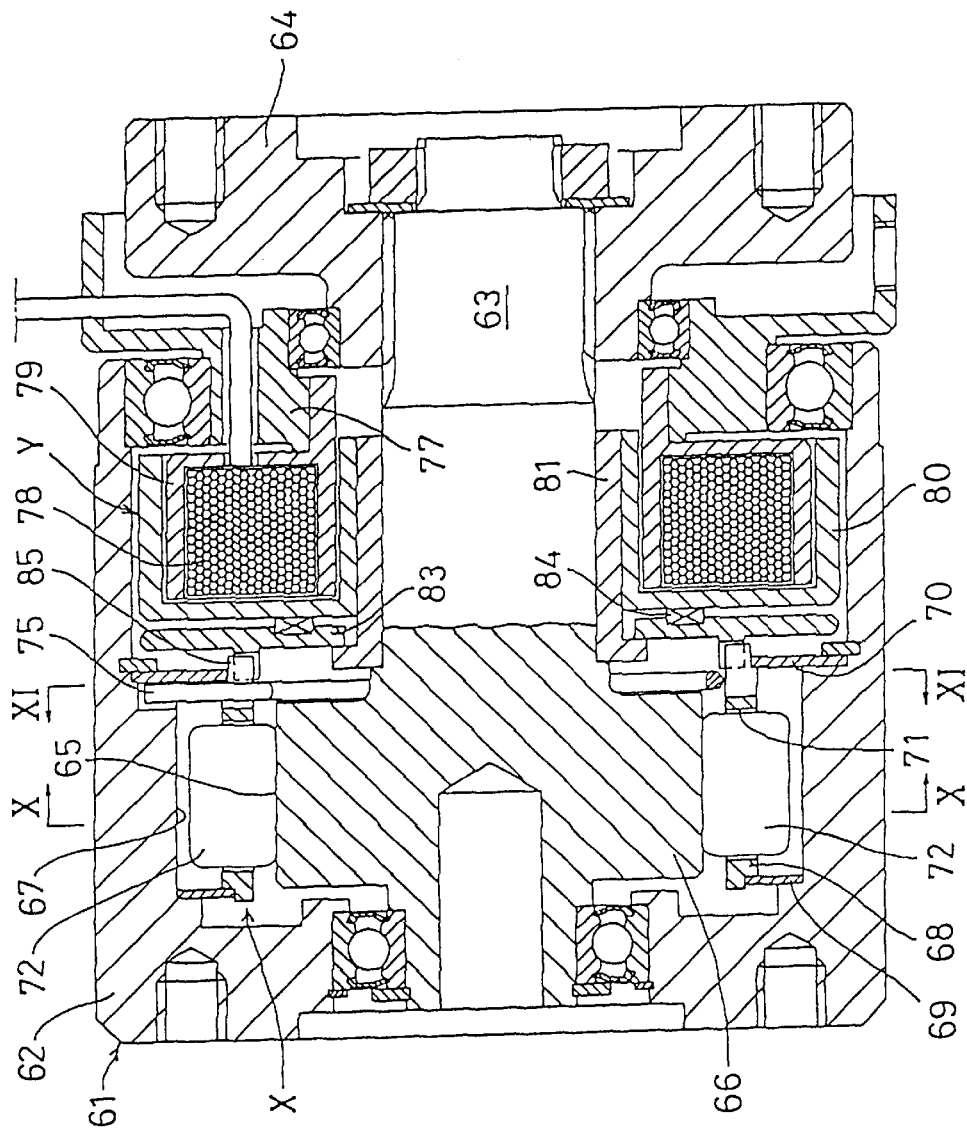
FIG. 9 is a vertical sectional view of a third embodiment of the rotation transmission device.
Figure 10:
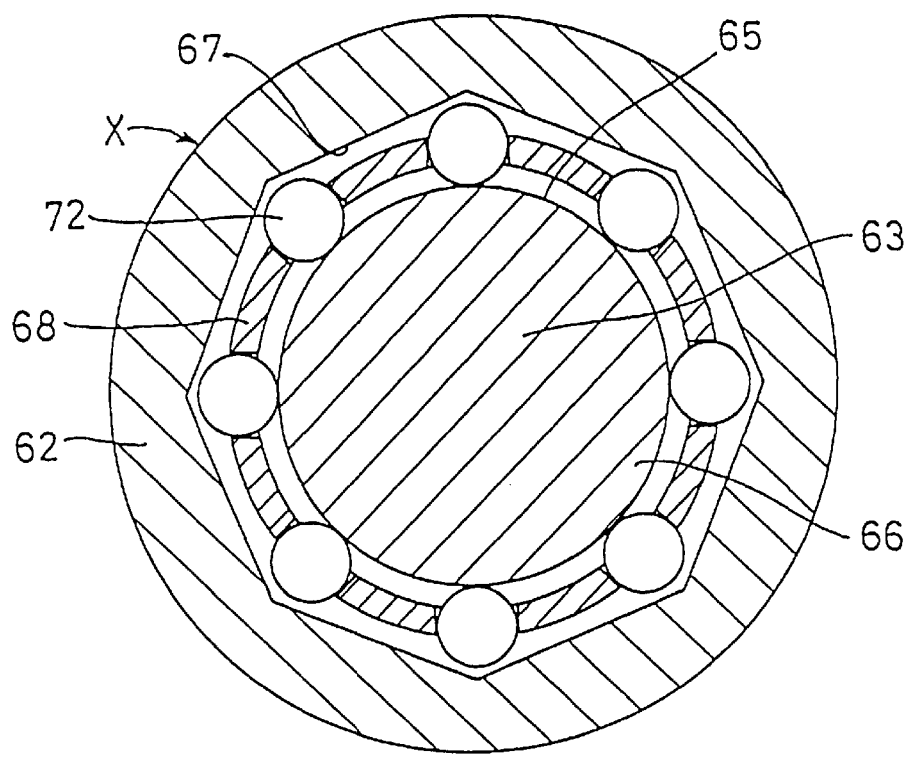
FIG. 10 is a sectional view taken along line X—X of FIG. 9.
Figure 11:
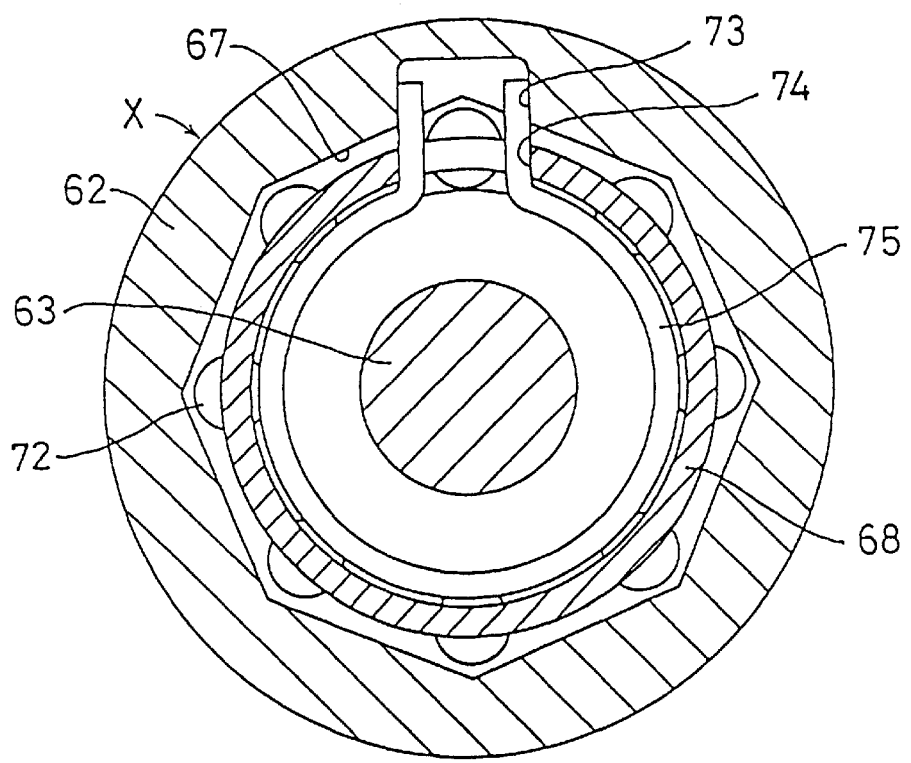
FIG. 11 is a sectional view taken along line XI—XI of FIG. 9.

FIGS. 9 to 11 show the third embodiment in which cam faces 67 are formed on the inner periphery of the outer ring 62, while a cylindrical face 65 is formed on the outer peripheral surface of the large-diameter portion 66 of the input shaft 63.

In this embodiment, too, the switch spring 75 is provided at the same axial end of the retainer 68 at which the armature 83 is provided, and urges the outer ring 62 and the retainer 68 to align their respective cutouts 73 and 74. Instead of using the ring-shaped switch spring 75, a coil spring, a leaf spring or any other spring member may be engaged in the cutouts 73 and 74 to align the cutouts 73 and 74.

Besides the four-wheel drive system, the rotation transmission device of any of the above embodiments can be used for a system which needs a changeover between transmission and non-transmission of driving force.

According to this invention, the output of the engine load sensor is applied to the controller of the rotation transmission device to control it based on this signal, so that it is possible to anticipate driver's abrupt accelerator operations and his intention before the rear wheels begin to rotate. Thus, when e.g. the vehicle starts on a low-$\mu$ road, it is possible to quickly lock the two-way clutch and change over to 4WD. Transition to 4WD can thus be made smoothly without shocks.

During the LOCK mode, it is possible to detect a state in which the driver is not depressing the accelerator while the vehicle is at a stop through the engine load sensor. Thus, in such a case, it is possible to stop the supply of current to the electromagnetic coil. This prevents a waste of energy and overheating.

Since the engine load sensor can detect an engine stall situation, if the engine should stall while the vehicle is travelling, it is possible to instantly stop delivering torque through the rotation transmission device, and to give a warning to the driver.

Since the switch spring is provided at the same axial end of the retainer at which the armature is provided, the force of the spring acts on the retainer solely as a moment about the central axis, and produces no undue dragging force, so that the retainer can rotate smoothly relative to the cam even without disposing any bearing therebetween. By engaging the switch spring and the armature in a single engaging portion, it is possible to reduce the number of machining steps for the retainer and thus machining cost.

By loosely mounting the armature between the nonmagnetizable rotor guide fixed to the rotor and the friction flange of the rotor, it is possible to prevent magnetic leakage through the rotor and the armature and thus to increase the armature attracting force.

Also, it is possible to adjust the moving distance of the armature in a sub-assembly stage. This is convenient for assembly.

What is claimed is:

1. A four-wheel drive system comprising a rotation transmission device for changeover between 2WD and 4WD mounted in a transfer case of an FR-based 4WD vehicle having an input shaft and in which the output from a transmission is transmitted directly to a propeller shaft for rear vehicle wheels and distributed to a propeller shaft for front vehicle wheels, or on a front wheel drive train of said 4WD vehicle, said rotation transmission device comprising a two-way clutch having engaging elements, and a current control means for controlling the locking state of said two-way clutch, a current to said current control means being controlled according to an input signal from a sensor detecting a load on an engine.

2. The system claimed in claim 1 wherein drive modes are manually selectable, and when a drive mode in which said two-way clutch is always locked has been selected, a current to said current control means is reduced or cut off while the vehicle is at a stop and the output of said engine load sensor is lower than a threshold.

3. The system claimed in claim 1 wherein if the output of said engine load sensor is indicating that the engine is not running while the vehicle is moving, a current to said current control means is cut off forcibly, thereby freeing said two-way clutch.

4. The system claimed in claim 1 wherein a warning lamp for the system is provided in a passenger compartment of the vehicle, and said warning lamp is turned on continuously or intermittently if the output of said engine load sensor is indicating that the engine is not running.

5. The system as claimed in claim 1 wherein a signal from said engine load sensor is applied to a controller, and said controller controls a current to said current control means according to the level of the signal.

6. The system as claimed in claim 1 wherein said engine load sensor is a sensor for detecting the amount of air inhaled into the engine.

7. The system as claimed in claim 1 wherein said engine load sensor is a negative pressure sensor for detecting the pressure of air inhaled into the engine.

8. The system as claimed in claim 1 wherein said engine load sensor is an accelerator switch or a sensor for detecting the degree of opening of a throttle sensor for detecting the degree of opening of a throttle valve.

9. The system as claimed in claim 1 wherein said engine load sensor is an engine revolution speed sensor.

10. The system as claimed in claim 1 wherein a current supplied to said current control means is controlled according to the output of said engine load sensor and an input signal from a switch for detecting the actuation of a dry clutch for manual transmission.

11. The system as claimed in claim 2 wherein a signal from said engine load sensor is applied to a controller, and said controller controls a current to said current control means according to the level of the signal.

12. The system as claimed in claim 3 wherein a signal from said engine load sensor is applied to a controller, and said controller controls a current to said current control means according to the level of the signal.

13. The system as claimed in claim 4 wherein a signal from said engine load sensor is applied to a controller, and said controller controls a current to said current control means according to the level of the signal.

14. The system as claimed in claim 2 wherein said engine load sensor is a sensor for detecting the amount of air inhaled into the engine.

15. The system as claimed in claim 3 wherein said engine load sensor is a sensor for detecting the amount of air inhaled into the engine.

16. The system as claimed in claim 4 wherein said engine load sensor is a sensor for detecting the amount of air inhaled into the engine.

17. The system as claimed in claim 5 wherein said engine load sensor is a sensor for detecting the amount of air inhaled into the engine.

18. The system as claimed in claim 2 wherein said engine load sensor is a negative pressure sensor for detecting the pressure of air inhaled into the engine.

19. The system as claimed in claim 3 wherein said engine load sensor is a negative pressure sensor for detecting the pressure of air inhaled into the engine.

20. The system as claimed in claim 4 wherein said engine load sensor is a negative pressure sensor for detecting the pressure of air inhaled into the engine.

21. The system as claimed in claim 5 wherein said engine load sensor is a negative pressure sensor for detecting the pressure of air inhaled into the engine.

22. The system as claimed in claim 2 wherein said engine load sensor is an accelerator switch or a sensor for detecting the degree of opening of a throttle sensor for detecting the degree of opening of a throttle valve.

23. The system as claimed in claim 3 wherein said engine load sensor is an accelerator switch or a sensor for detecting the degree of opening of a throttle sensor for detecting the degree of opening of a throttle valve.

24. The system as claimed in claim 4 wherein said engine load sensor is an accelerator switch or a sensor for detecting the degree of opening of a throttle sensor for detecting the degree of opening of a throttle valve.

25. The system as claimed in claim 5 wherein said engine load sensor is an accelerator switch or a sensor for detecting the degree of opening of a throttle sensor for detecting the degree of opening of a throttle valve.

26. The system as claimed in claim 2 wherein said engine load sensor is an engine revolution speed sensor.

27. The system as claimed in claim 3 wherein said engine load sensor is an engine revolution speed sensor.

28. The system as claimed in claim 4 wherein said engine load sensor is an engine revolution speed sensor.

29. The system as claimed in claim 5 wherein said engine load sensor is an engine revolution speed sensor.

30. The system as claimed in claim 5 wherein a current supplied to said current control means is controlled according to the output of said engine load sensor and an input signal from a switch for detecting the actuation of a dry clutch for manual transmission.

31. The system as claimed in claim 6 wherein a current supplied to said current control means is controlled according to the output of said engine load sensor and an input signal from a switch for detecting the actuation of a dry clutch for manual transmission.

32. The system as claimed in claim 7 wherein a current supplied to said current control means is controlled according to the output of said engine load sensor and an input signal from a switch for detecting the actuation of a dry clutch for manual transmission.

33. The system as claimed in claim 8 wherein a current supplied to said current control means is controlled according to the output of said engine load sensor and an input signal from a switch for detecting the actuation of a dry clutch for manual transmission.

34. The system as claimed in claim 9 wherein a current supplied to said current control means is controlled according to the output of said engine load sensor and an input signal from a switch for detecting the actuation of a dry clutch for manual transmission.

35. A rotation transmission device comprising an outer ring, an input shaft provided in said outer ring, one of said outer ring and said input shaft having a cylindrical face and the other having a plurality of cam faces opposite said cylindrical face, a retainer mounted between said outer ring and said input shaft and having pockets, a plurality of rollers received in said pockets and adapted to engage between said cylindrical face and said cam faces when said outer ring rotates relative to said input shaft, an elastic member mounted between said retainer and said outer ring or said input shaft for urging said rollers to a disengaging neutral position, an armature coupled to one of two ends of said retainer so as to be axially movable but nonrotatable relative to said retainer, a friction member mounted between said outer ring and said input shaft and fixed to one of said outer ring and said input shaft, a nonmagnetizable flange fixed to said friction member, and an electromagnet mounted between said outer ring and said input shaft for attracting said armature, said armature being mounted between the frictional surface of said friction member and said flange with axial play, said elastic member engaging said retainer at one of said two ends of said retainer adjacent said armature.

36. The device claimed in claim 35 wherein said elastic member engages in a first cutout formed in said other of said outer ring and said input shaft at one axial end thereof, and a second cutout formed in said retainer at one axial end thereof and having the same width as said first cutout.

37. The device claimed in claim 35 wherein said elastic member is a ring spring having the shape of a letter C.

38. The four-wheel drive system as claimed in claim 1 wherein the rotation transmission device comprises an outer ring, an input shaft provided in said outer ring, one of said outer ring and said input shaft having a cylindrical face and the other having a plurality of cam faces opposite said cylindrical face, a retainer mounted between said outer ring and said input shaft and having pockets, a plurality of rollers received in said pockets and adapted to engage between said cylindrical face and said cam faces when said outer ring rotates relative to said input shaft, an elastic member mounted between said retainer and said outer ring or said input shaft for urging said rollers to a disengaging neutral position, an armature coupled to one of two ends of said retainer so as to be axially movable but nonrotatable relative to said retainer, a friction member mounted between said outer ring and said input shaft and fixed to one of said outer ring and said input shaft, a nonmagnetizable flange fixed to said friction member, and an electromagnet mounted between said outer ring and said input shaft for attracting said armature, said armature being mounted between the frictional surface of said friction member and said flange with axial play, said elastic member engaging said retainer at one of said two ends of said retainer adjacent said armature.

* * * * *